United States Patent [19]

Fukuoka et al.

[11] Patent Number: 4,861,398

[45] Date of Patent: Aug. 29, 1989

[54] METHOD FOR MAKING A THIN FILM MAGNETIC HEAD

[75] Inventors: Hirotsugu Fukuoka, Hitachi; Kanji Kawakami, Mito; Makoto Aihara; Mitsuo Suda, both of Hitachi; Kouji Takeshita; Yukihiro Isono, both of Odawara, all of Japan

[73] Assignee: Hitachi, Ltd., Tokyo, Japan

[21] Appl. No.: 123,278

[22] Filed: Nov. 20, 1987

[51] Int. Cl.$^4$ .............................................. G11B 5/127
[52] U.S. Cl. ........................................ 156/64; 29/603; 51/165 R; 156/154; 360/126
[58] Field of Search ............... 156/64, 378, 379, 153, 156/154; 29/603; 51/165 R; 360/110, 126

[56] References Cited

U.S. PATENT DOCUMENTS

| | | | |
|---|---|---|---|
| 3,967,368 | 7/1976 | Brook et al. | 29/603 |
| 4,155,106 | 5/1979 | Muraoka | 29/603 X |
| 4,423,550 | 1/1984 | Fujioka | 29/603 |
| 4,675,986 | 6/1987 | Yen | 29/603 |
| 4,689,877 | 9/1987 | Church | 29/603 |
| 4,727,643 | 3/1988 | Schewe et al. | 29/603 |
| 4,739,562 | 4/1988 | Kracke et al. | 29/603 |

Primary Examiner—David Simmons
Attorney, Agent, or Firm—Antonelli, Terry & Wands

[57] ABSTRACT

DC bias currents are applied to a conducting wire of a thin film magnetic head to be inspected. When the DC bias currents ($I_0$, $I_1$, $I_2$) are supplied to the conducting wire, the impedances ($Z_0$, $Z_1$, $Z_2$) corresponding to the DC bias currents are measured. When a ratio ($|Z_1-Z_0|/|Z_2-Z_0|$) corresponding to an overwrite characteristic (OW) reaches to a predetermined value by lapping tip portions of an upper magnetic layer and a lower magnetic layer of the magnetic head, the lapping process of the magnetic head is finished.

6 Claims, 5 Drawing Sheets

METHOD FOR MAKING A THIN FILM MAGNETIC HEAD

FIELD OF THE INVENTION

The present invention relates to a method for making a thin film magnetic head.

BACKGROUND OF THE INVENTION

A disk storage system is utilized to write new data on old data which become unnecessary on a magnetic disk as a magnetic recording medium. Thereby, old data are erased and also new data are recorded. Accordingly, a magnetic field generated from a magnetic head used for writing new data necessitates at least a magnitude sufficient for writing data onto a total thickness of the recording medium. When the magnetic field generated from the magnetic head is weak so that new data can not be written onto the total thickness of the recording medium, old data remain thereon without being erased and remain recorded in overlapping relationship with new recorded data.

For this reason, the magnetic field strength generated at the magnetic head used for the disk storage system is evaluated by an overwrite characteristic indicative of the writing ability thereof.

The overwrite characteristic is shown by a ratio of reproduced output of new data to that of the remaining old data which has not been erased on a magnetic disk.

Practically, the overwrite characteristic is during the manufacturing process of the magnetic head wherein data written by the lowest frequency among modulated signals used by the disk storage system is used as old data and other data written by the highest frequency thereamong is used as new data for erasing the old data. A current value of the signals for exciting the magnetic head is utilized for both writing old data and new data.

Suppose that a reproducing output value by the non-erased old data which was written by the lowest frequency is $\Delta E1f$, and a reproducing output value of the new data written by the highest frequency is $E2f$; the value OW of the overwrite characteristic is represented by a decibel expression of these ratio as follows:

$$OW = -20 \log E2f/\Delta E1f \quad \text{(dB)}$$

A value of the overwrite characteristic of a magnetic head used as a product is approximately $-25$ dB.

Recently, in the disk storage system, the thin film magnetic head is required to be one for increasing recording density to a recording medium and attaining a large memory capacity.

In the thin film magnetic head, the magnetic field strength generated depends on the shape of the tip portions of the magnetic core, especially, depends largely on the throat height.

Conventionally, many attempts have been made with respect to methods for adjusting the throat height for producing the thin film magnetic head having a writing characteristic in such a manner that necessary OW value is obtained.

For instance, such an idea is disclosed in FIGS. 1 and 2 of Japanese Patent Laid-Open No. 60-254404 published on December 16, 1985 having the title of "Manufacturing method of thin film magnetic head".

However, in accordance with this disclosure a thin film magnetic head is manufactured in such a manner that the track width TW, the pole lengths $P_1$, $P_2$ (the thicknesses of the magnetic layers forming the magnetic gap portion), and the magnetic gap length G1 (the thickness of the non-magnetic layer forming the magnetic gap portion) thereof are small. In this case, only by forming the throad height to a predetermined size, the writing characteristic or ability thereof can not be properly determined. Namely, the writing characteristic is affected by the total configuration at the tip portions of the magnetic head.

Further, in the above-explained thin film magnetic head, when the throat height is decreased, for instance, to approximately 0.3 $\mu$m as well as in the case of the track width, etc., the tip portions of the magnetic head cannot be measured by an optical method.

For that reason, the judgment whether the writing characteristic or ability of the thin film magnetic head manufactured is good or not, has to be carried out by measuring the OW value after the manufactured thin film magnetic head is assembled into the disk storage system, and the recording and reproducing thereof are operated.

SUMMARY OF THE INVENTION

An object of the present invention is to provide a method for easy judging of pass or failure of the inspection with respect to the writing characteristic of the thin film magnetic head, whereby the manufacturing of the magnetic head with high accuracy can be obtained.

The present invention resides in the manufacturing method that a DC bias current is applied to the thin film magnetic head to be inspected, an impedance drop caused by a saturation of the magnetic layers of the magnetic head is measured, whereby, the writing characteristic or ability of the magnetic head is detected so that the manufacturing of the magnetic head is carried out with high accuracy.

The thin film magnetic head is liable to be most saturated magnetically in the tip portions of the magnetic layers. The state of the magnetic saturation depends on the configuration of the tip portions of the magnetic layers.

Further, the writing ability of the thin film magnetic head depends on the configuration of the tip portions of the magnetic head.

Therefore, there is a strong relation between the value of the impedance drop explained above and the writing characteristic or ability.

By using the relation, the writing characteristic is able to be detected based on the value of the impedance drop.

DETAILED DESCRIPTION OF THE PREFERRED EMBODIMENTS

Figure 1:
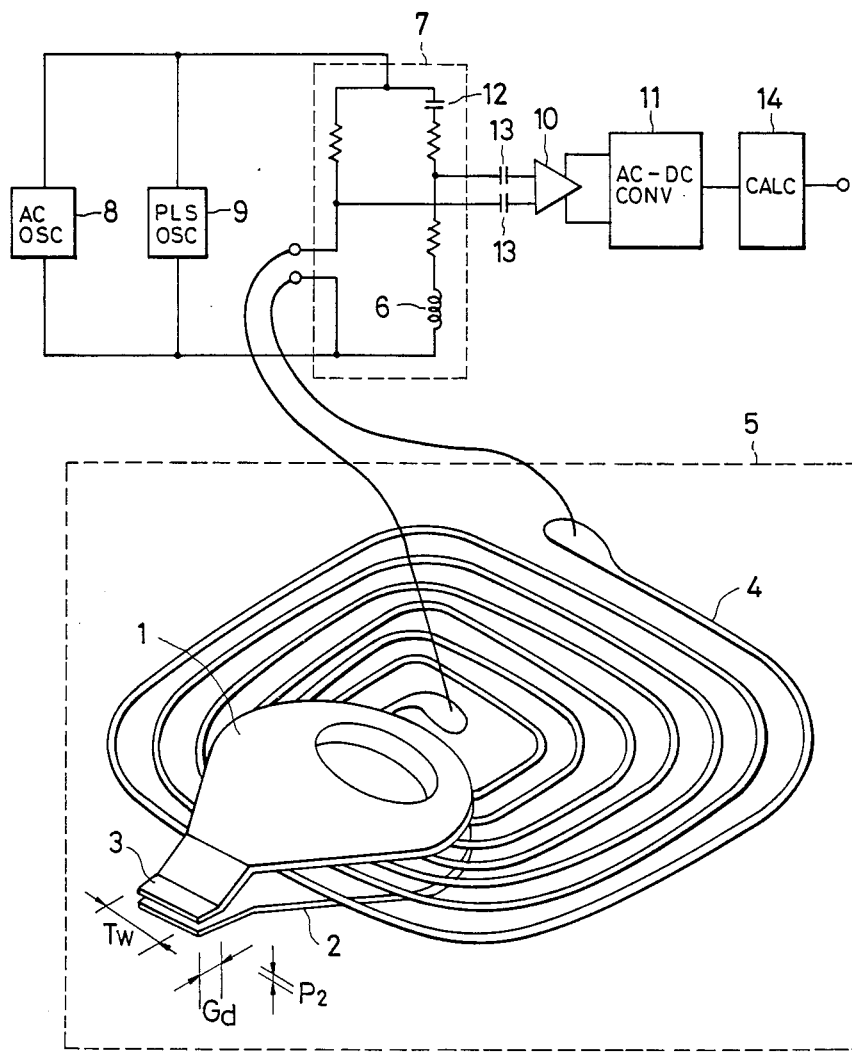
FIG. 1 is an explanation diagram of one embodiment of the present invention.
Figure 4A:
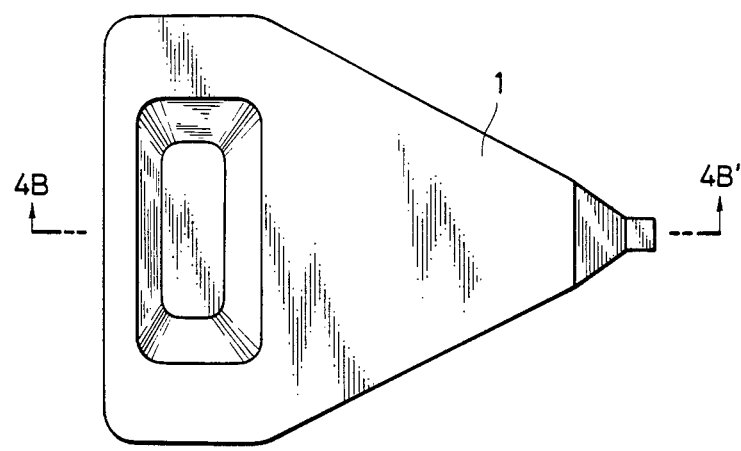
FIGS. 4A-4C are diagrams for explaining flow of magnetic flux of the magnetic head of the present invention.
Figure 4B:
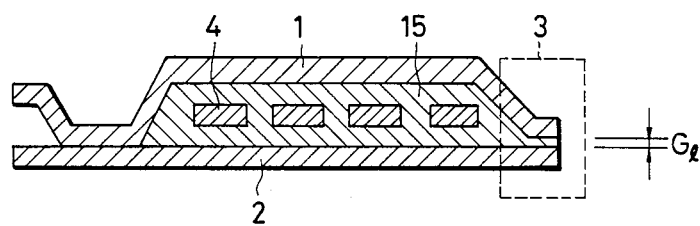

Referring to FIG. 1, the magnetic head 5 in one embodiment of the present invention, is laminated by an upper magnetic layer 1, a lower magnetic layer 2, a conductor winding 4, and an electric insulating layer 15 in a predetermined order, for instance such as shown in FIG. 4B, using photolithography; and the magnetic gap G is formed at the tip portions 3 of the magnetic head comprising the upper magnetic layer 1 and the lower magnetic layer 2. The overwrite characteristic of the magnetic head 5 is detected based on the impedance of the magnetic head 5 as explained later.

An apparatus for measuring impedance in the embodiment arranges the magnetic head 5 to one branch of a bridge circuit 7, as shown in FIG. 1. A coil 6 having an inductance approximately equal to the magnetic head 5 and a condenser 12 for cutting DC current are arranged opposite to the magnetic head 5 of the bridge circuit 7. An AC oscillator 8 as a high frequency signal source (for example, several MHz), and a pulse oscillator 9 as a bias current source for exciting the magnetic head 5 and for causing magnetic saturation of the magnetic layers are connected to input terminals of the bridge circuit 7. A high frequency differential amplifier 10 for amplifying the output of the bridge circuit 7, an AC-DC converter 11, and a calculator 14 are connected to output terminals of the bridge circuit 7. Gd denotes a throat height, $P_2$ is a pole length of the lower magnetic layer 2, and TW is a track width of the tip portions 3.

Next, the operation of the above embodiment will be explained.

The high frequency signal from the AC oscillator 8 is input to the bridge circuit 7, and the output of the bridge circuit 7 is produced through the condenser 13. After the output of the bridge circuit 7 is amplified by the differential amplifier 10, the amplitude thereof is detected by the AC-DC converter. The value of the amplitude is proportional to the potential difference caused by the disproportion of the impedance of the bridge circuit 7 generated by the impedance of the magnetic head 5, and is detected as a signal corresponding to the impedance of the magnetic head 5.

Herein, the amplitude of the high frequency signal given to the bridge circuit 7 is made sufficiently small in a region to be measured in such a manner that the magnetic head 5 is not magnetically saturated.

In addition to the high frequency signal, a current generated at the pulse oscillator 9 is flowed to the conductor winding 4 of the magnetic head as a bias current so that the magnetic saturation of the magnetic head 5 occurs periodically.

Figure 2A:
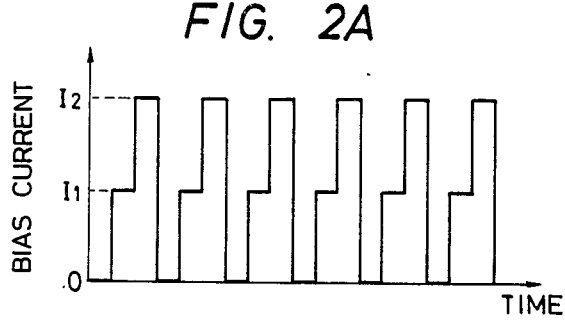
FIG. 2A shows waveform of pulse current generated from a pulse oscillator shown in FIG. 1.
Figure 2B:
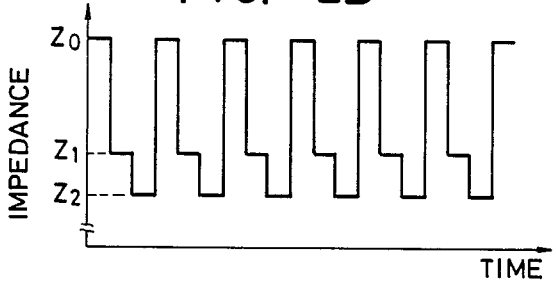
FIG. 2B shows waveform of the impedance output from an AC-DC converter shown in FIG. 1.

For instance, when a periodically repetitive pulse current having values of zero, $I_1$, and $I_2$ as shown in FIG. 2A is generated from the pulse oscillator 9, the impedance value output from the AC-DC convertor 11 becomes as shown in FIG. 2B.

The calculator 14 computes and outputs $|Z_1-Z_0|/|Z_2-Z_1|$ which is a ratio of impedance variation values of $|Z_1-Z_0|$ and $|Z_2-Z_0|$.

The output value represents the state of the magnetic saturation of the magnetic heads caused by the bias current. Correlation between the value of $|Z_1-Z_0|/|Z_2-Z_0|$ and the overwrite characteristic of the magnetic heads is shown in FIG. 3.

The write signal frequencies used at measuring the overwrite characteristic are 2.3 MHZ and 9 MHZ, respectively. And the bias currents $I_1$, and $I_2$ are 7.5 mA, and 15 mA, respectively.

Figure 3:
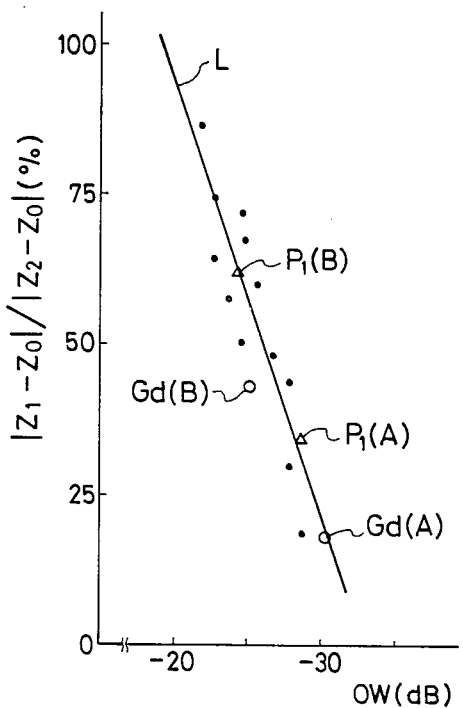
FIG. 3 shows a characteristic diagram showing a relation between the OW value, and the value of $|Z_1-Z_0|/|Z_2-Z_0|$ when the bias currents of a calculator shown in FIG. 1 are zero, $I_1$, and $I_2$, and corresponding impedance values thereof are $Z_0$, $Z_1$, and $Z_2$, respectively.

As shown in FIG. 3, the overwrite characteristic and $|Z_1-Z_0|/|Z_2-Z_0|$ which is a value that characterizes the state of the magnetic saturation of the magnetic heads caused by the bias current, have a linear functional relation as shown by a straight line L of FIG. 3.

For this reason, by tabulating the correlation diagram as shown in FIG. 3 and storing it in the calculator 14, pass or failure of the overwrite characteristic is able to be judged based on the value of $|Z_1-Z_0|/|Z_2-Z_0|$. That is, the overwrite value of the magnetic head can be decided from the ratio of $|Z_1-Z_0|/|Z_2-Z_0|$ as apparent from FIG. 3.

Figure 4C:
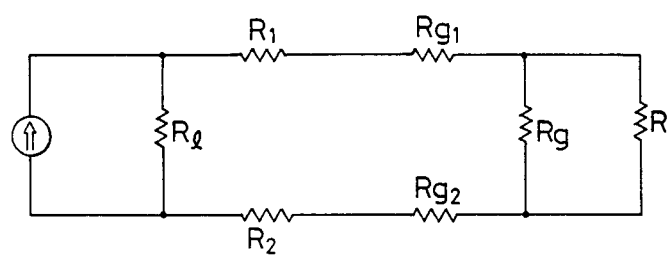
Figure 5:
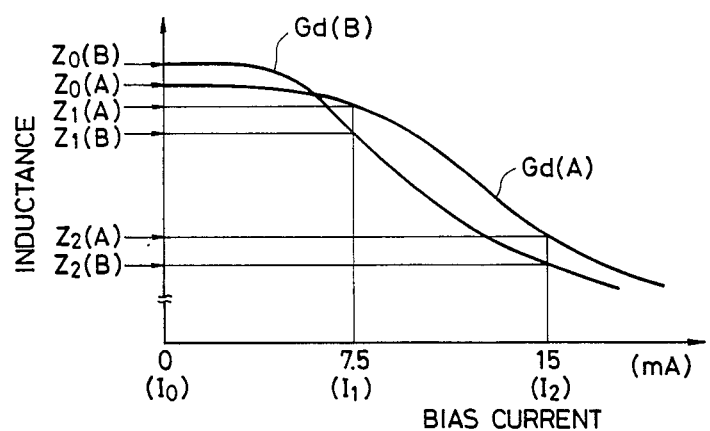
FIG. 5 shows characteristic diagrams showing the relation between bias current and inductance, when the throat heights of the magnetic head are different.
Figure 6:
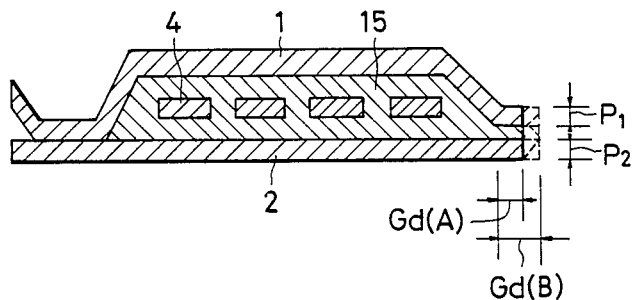
FIG. 6 shows a configuration diagram of the magnetic head when the throat heights are varied as Gd(A), and Gd(B) relating to FIG. 5.

Hereunder, the principle of the present invention will be explained referring to FIGS. 4, 5, and 6, which is based on the magnetic saturation of the magnetic layers of the magnetic head 5.

FIG. 4A shows a front view observed from the outside above of the upper magnetic layer 1 of the magnetic head 5. FIG. 4B is a sectional view seen from 4B–4B' in FIG. 4A. FIG. 4C is a equivalent circuit for showing the magnetic flow of the magnetic head shown in FIGS. 4A and 4B which is considered as a magnetic circuit.

As shown in FIGS. 4A and 4B, layers the magnetic head 5 has a narrow track width at a tip portions 3 of the magnetic core. This is to strengthen the magnetic field generated from the magnetic head 5 at the tip portions 3 of the magnetic layer by concentrating the magnetic flux generated by the current flowing to the conductor winding 4 and flowing through the inner portion of the magnetic layers.

The current flowing through the conductor winding 4 generates a magnetomotive force. Suppose that the magnetic resistance values of the upper magnetic layer 1 and the lower magnetic layer 2 are $R_{g1}$, $R_1$; and $R_2$, $R_2$, respectively, dividing the tip portions 3 and other portions in each upper magnetic layer 1 and lower magnetic layer 2. And suppose that the magnetic resistance at the tip portions 3 is $R_g$, and that at other portions are $R_l$, dividing the magnetic resistance to the magnetic flux leaked between the upper magnetic layer 1 and the lower magnetic layer 2 into both the tip portions 3 of and other portions.

Further, suppose that the magnetic resistance to the magnetic field generated at the magnetic head 5 is R.

Only the magnetic flux passing through the magnetic resistance R after it passes through each magnetic resistance of $R_l$, $R_1$, $R_{g1}$, $R_2$, and $R_{g2}$ to the magnetomotive force generated based on the current flowing through the conductor winding 4, becomes the magnetic field at the magnetic head 5.

In general, the magnetic resistances of $R_{g1}$, $R_{g2}$ are larger than that of $R_1$, $R_2$, since the magnetic flux paths of $R_{g1}$, $R_{g2}$ are narrow. Since the magnetic flux path of the resistance $R_g$ is short, the magnetic resistance of $R_g$ is small compared with that of $R_l$. Accordingly, it is said that the magnetic resistances $R_{g1}$, $R_{g2}$, and $R_g$ at the tip portions 3 of the magnetic head decides the magnetic flux amount flowing through the resistance R.

The value of the resistance $R_g$ depends on the configuration of the magnetic gap formed at the tip portions 3 of the magnetic head, which is formed by the upper magnetic layer 1 and the lower magnetic layer 2. The more the throat height Gd of the magnetic head is larger, the more the value of the resistance $R_g$ is smaller. Then, the magnetic flux amount passing through the magnetic gap is increased, and that passing through the resistance R is decreased.

In the magnetic head having a small track width Tw and pole length P, and having large throat height Gd; the values of the resistances $R_{g1}$ and $R_{g2}$ become larger so that the magnetic flux amount passing through the resistance R becomes small.

Therefore, the magnetic field strength depends on the configuration of the tip portions 3 of the magnetic head.

The tip portions 3 of the magnetic head are constituted, as explained already, to concentrate the magnetic flux. Accordingly, when the magnetic flux passing through the magnetic layers is increased, it is the tip portions 3 of the magnetic layers that the magnetic saturation occurs at first. When magnetic saturation occurs at the tip portions 3, the magnetic resistance at the portion becomes larger. For this reason, the portion having large magnetic resistance becomes magnetically saturated by a small magnetic flux amount.

The increasing of the magnetic resistance is detected as a decreasing of the impedance of the magnetic head 5.

Hereunder, the characteristics in case of the different throat heights Gd(A), and Gd(B) will be explained referring to FIGS. 5 and 6. In case that the throat height Gd is long as Gd(A) or deep as Gd(B) shown in FIG. 6, the impedance value thereof becomes $Z_0(A)$, $Z_1(A)$, $Z_2(B)$; or $Z_0(B)$, $Z_1(B)$, $Z_2(B)$, corresponding to the common bias currents $I_0$(OmA), $I_1$(7.5 mA) and $I_2$(15 mA) as shown in FIG. 5. Namely, when the throat height is Gd(B), the impedance value is decreased by a small bias current as compared with the case of Gd (A). This phenomenon will be explained hereunder referring to the magnetic circuit shown in FIG. 4C. When the throat height is long as Gd(B), the value of the resistance $R_g$ becomes small compared with the short throat height Gd(A), so that the magnetic flux flowing through the resistances $R_{g1}$, and $R_{g2}$ in the long throat height of Gd(B) becomes large compared with that in the short throat height of Gd(A) to the same bias current. For this reason, when the throat height is long such as Gd(B), the resistances $R_{g1}$, and $R_{g2}$ occur the magnetic saturation by a small bias current, so that the impedance thereof is decreased. When the value of the resistance $R_g$ is small, sufficient magnetic flux is not flowed through the resistance R, so that the magnetic field generated at the magnetic head becomes small. In the case that the magnetic saturation of the magnetic head is obtained by a small bias current, the value of $|Z_1-Z_0|/|Z_2-Z_0|$ becomes large.

Figure 7:
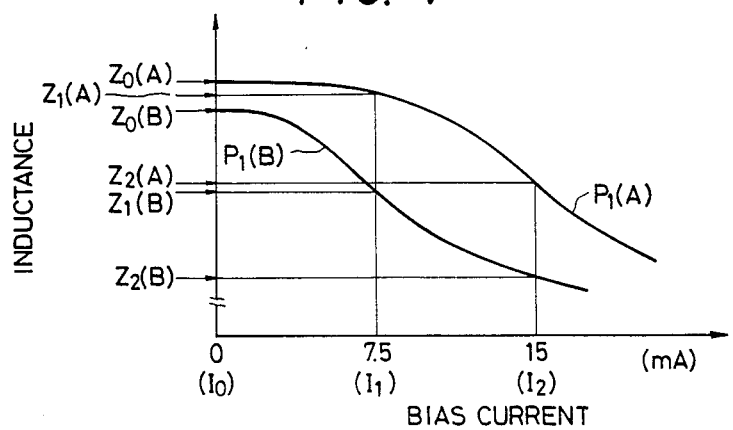
FIG. 7 shows characteristic diagrams showing relation between bias current and inductance, when the pole lengths of the magnetic head are different.
Figure 8:
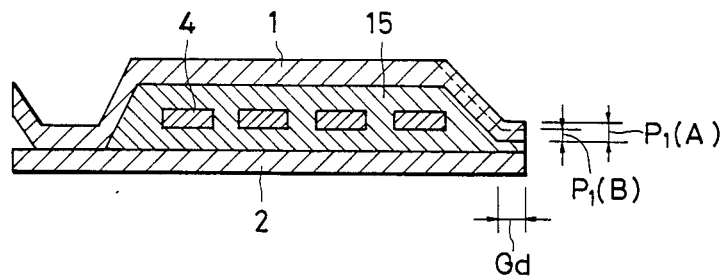
FIG. 8 shows a configuration diagram of the magnetic head when the pole lengths are varied as $P_1(A)$, and $P_1(B)$ corresponding to that shown in FIG. 7.

Next, the characteristics in case of the different pole lengths $P_1(A)$, and $P_1(B)$ will be explained referring to FIGS. 7 and 8. In case that the pole length $P_1$ is thick as $P_1(A)$ or thin as $P_1(B)$ shown in FIG. 8, the impedance value thereof becomes $Z_0(A)$, $Z_1(A)$, $Z_2(A)$; or $Z_0(B)$, $Z_1(B)$, $Z_2(B)$, corresponding to the common bias currents $I_0$(OmA), $I_1$(7.5 mA), and $I_2$(15 mA) as shown in FIG. 7. Namely, when the pole length is $P_1(B)$, the impedance valve is decreased by a small bias current compared with the case of $P_1(A)$. This phenomenon will be explained hereunder referring to the magnetic circuit shown in FIG. 4C. When the pole length is thin as $P_1(B)$, the value of the resistance $R_{g1}$ becomes large compared with the case of the thick pole length $P_1(A)$. Namely, the magnetic flux path of the portion of the resistance $R_{g1}$ becomes narrow. For this reason, when the pole length is thin as $P_1(B)$, the resistance $R_{g1}$ effects the magnetic saturation by a small bias current, so that the impedance of the magnetic head is decreased. When the resistance $R_{g1}$ effects the magnetic saturation, sufficient magnetic flux is not flowed through the resistance R, so that the magnetic field generated at the magnetic head becomes small.

In case that the pole length $P_2$ of the lower magnetic layer 2 is varied, the characteristic diagram between the bias current and $|Z_1-Z_0|/|Z_2-Z_0|$ can be obtained as well as in the case that the pole length $P_1$ of the upper magnetic layer 1 is varied as explained above.

When the throat height is long or the pole length is thin, the magnetic head is magnetically saturated by small bias current.

Accordingly, the magnetic head which is magnetically saturated by a small bias current has a large value of $|Z_1-Z_0|/|Z_2-Z_0|$, so that the magnetic field generated at the magnetic head becomes small.

For determining that the magnetic resistance of $R_{g1}$, $R_{g2}$, and $R_g$ are appropriate, it is necessary to know the state of the impedance drop.

For making variables characterized in the state of the impedance drop, it is necessary that the variation of the impedance is measured at least at two points in which the values of the bias current are different, and the ratio of the variation is calculated.

However, the inductance value of the thin film magnetic head is in the order of 200 nH to 300 nH, and the value of the inductance drop is 20 to 30 nH caused by the magnetic saturation.

Accordingly, since sufficient accuracy can not be obtained by a conventional impedance meter, it is necessary to measure the impedance by the apparatus shown in FIG. 1.

When the resistance value of the conductor winding 4 becomes large by miniaturizing the conductor winding 4 of the magnetic head 5, the impedance drop is decreased by the effect of heating of the conductor winding 4 caused by the bias current because the resistance value is increased by the temperature increasing of the conductor winding 4.

In this case, it is better that the method of the present invention is carried out only by measurement of the inductance in which the resistance value is removed from the variation value of the impedance. The measurement of the inductance is carried out by further arranging an apparatus which compares the output of the differential amplifier 10 and the signal of the AC oscillator 8, and detects the phase difference therebetween; and by measuring the inductance based on the impedance and the phase difference obtained.

Further, in the manufacturing method comprising the steps of forming the throat height of the thin film magnetic head larger than a predetermined length, lapping the tip portion 3 of the magnetic head, and forming the magnetic gap portion; the impedance measuring method of the present invention can be applied during the lapping process of the above-mentioned manufacturing method.

In this case, according to the embodiment of the present invention, a thin film magnetic head having a sufficient writing characteristic is produced by detecting when the overwrite characteristic reaches to a predetermined value, judging pass or failure of the magnetic head, and finishing the lapping procedure.

Figure 9:
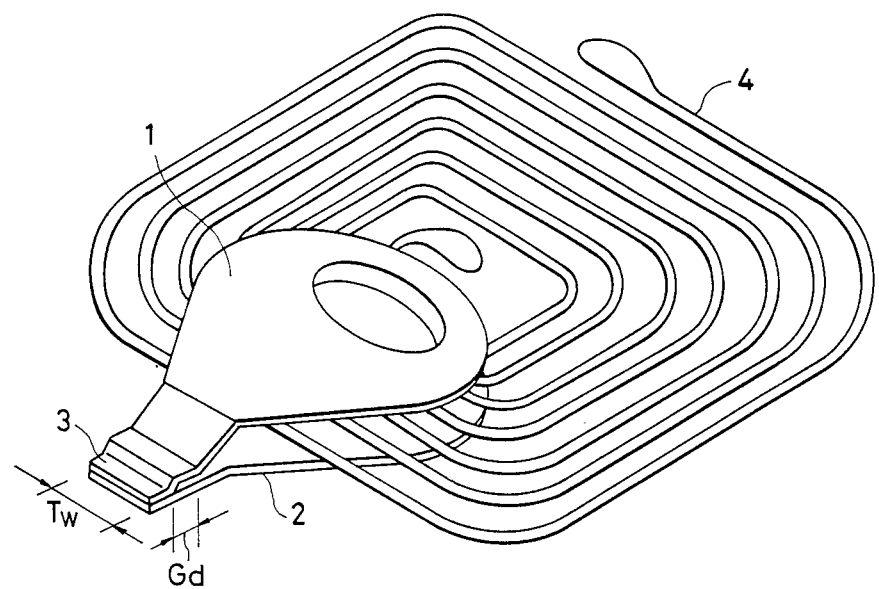
FIG. 9 shows a configuration diagram of the magnetic head in which magnetic layers are contacted magnetically at the tip portions of the magnetic head.

Further, in the case of the magnetic head as shown in FIG. 9 in which the upper magnetic layer 1 and the lower magnetic layer 2 of the tip portions 3 of the magnetic head are contacted magnetically; the impedance measuring method of the present invention can be applied during the lapping processing of the tip portions 3 by when the overwrite characteristic reaches to a predetermined value and finishing the lapping processing of the magnetic head, so that a thin film magnetic head having a profitable writing characteristic is able to manufacture. The magnetic circuit of the magnetic head shown in FIG. 9 becomes that the resistance $R_g$ is formed by a magnetic substance, and the value of the magnetic resistance $R_g$ is very small in FIG. 4C. Comparing the magnetic head shown in FIG. 9 with that shown in FIG. 1, the former is same to that the throat height Gd of the magnetic head shown in FIG. 1 is very long. In the magnetic head shown in FIG. 9, when the tip portions of the magnetic head is lapped and the value of $|Z_1-Z_0|/|Z_2-Z_0|$, for instance as in the case of FIG. 3, the contacting portions of the tip portions of the magnetic head are removed, at the same time it seems that as if the throat height becomes narrow suddenly, and the overwrite characteristic is detected to reach a predetermined value.

According to the embodiments of the present invention, the writing characteristic is measured by using the magnetic saturation phenomenon depending on the total configuration of the tip portions of the magnetic head, so that the direct relation is obtained to the writing characteristic or ability of the magnetic head, and the writing characteristic is detected without measuring the writing characteristic actually.

And, the writing characteristic is able to be detected easily only by connecting an appropriate apparatus for measuring the impedance and the magnetic head using lead wires or probes.

What is claim is:

1. A method for making a thin film magnetic head comprising the steps of:
    laminating magnetic layers, an electric insulating layer, and a conducting wire in the thickness directions thereof in a predetermined order;
    effecting lapping processing of tip portions of the layers so as to form the magnetic head with a throat height;
    detecting an overwrite characteristic of the magnetic head in such a manner that a ratio $|Z_1-Z_0|/Z_2-Z_0$ of each variation $Z_1-Z_0$, $Z_2-Z_0$ of an impedance $Z_0$ is lower than a predetermined value when the conducting wire has a DC bias current $I_0$ having a magnitude containing a zero value applied thereto so that the impedance value thereof is $Z_0$, and when the conducting wire has at least two DC bias currents of $I_1$ and $I_2$ applied thereto so that the impedance values are $Z_1$ and $Z_2$, respectively; and
    determining that the overwrite characteristic OW of the magnetic head reaches a desired value when the ratio $|Z_1-Z_0|/|Z_2-Z_0|$ becomes lower than the predetermined value.

2. The method according to claim 1, wherein the lapping processing is completed by measuring the overwrite characteristic of the magnetic head based upon the ratio, and detecting that the magnetic head reaches the desired value, when the throat height formed by the lapping processing of the tip portions has a throat height greater than a predetermined value.

3. The method according to claim 2, wherein the tip portions of the magnetic layers are formed to have a predetermined throat length.

4. The method according to claim 2, wherein the tip portions of the magnetic layers are spaced apart from each other.

5. The method according to claim 2, wherein the tip portions of the magnetic layers are arranged to contact each other.

6. The method according to claim 1, wherein DC pulses O, $I_1$, $I_2$ are repeatedly applied to the conductor wire from a pulse oscillator and the ratio $|Z_1-Z_0|/|Z_2-Z_0|$ is calculated by a calculator on the basis of the impedances $Z_0$, $Z_1$, $Z_2$ in accordance with the DC pulses O, $I_1$, $I_2$.

* * * * *